United States Patent
Turner

(10) Patent No.: US 6,324,043 B1
(45) Date of Patent: Nov. 27, 2001

(54) RESIDUAL CURRENT DETECTOR WITH FAIL SAFE LOCKOUT DEVICE

(75) Inventor: David Curtis Turner, Imperial, PA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/407,399

(22) Filed: Sep. 28, 1999

(51) Int. Cl.[7] ....................................................... H02H 5/04
(52) U.S. Cl. .......................... 361/104; 361/72; 361/103; 361/104; 361/114; 361/115
(58) Field of Search ................... 361/59, 72, 71, 361/103, 104, 114, 115, 160, 170, 187, 161; 337/401, 407–409, 123, 388; 200/325

(56) References Cited

U.S. PATENT DOCUMENTS

| | | | |
|---|---|---|---|
| 4,384,820 | * 5/1983 | Sims | 415/113 |
| 4,568,899 | 2/1986 | May et al. . | |
| 4,631,624 | * 12/1986 | Dvorak et al. | 361/89 |
| 4,686,600 | 8/1987 | Morris et al. . | |
| 4,851,951 | * 7/1989 | Foster, Jr. | 361/50 |
| 5,907,461 | 5/1999 | Hartzel et al. . | |
| 5,920,451 | 7/1999 | Fasano et al. . | |
| 5,936,817 | 8/1999 | Matsko et al. . | |
| 5,956,218 | * 9/1999 | Berthold | 361/42 |
| 6,040,967 | * 3/2000 | DiSalvo | 361/42 |
| 6,040,971 | * 3/2000 | Martenson et al. | 361/118 |

* cited by examiner

Primary Examiner—Josie Ballato
Assistant Examiner—Vaughn Marquis
(74) Attorney, Agent, or Firm—Martin J. Moran

(57) ABSTRACT

This invention provides a residual current detector comprising a trip circuit; a magnetic lock assembly including a solenoid that operates in response to a signal from the trip circuit, causing movement of an operating member, with the magnetic lock further including a reset mechanism for resetting the residual current detector following a trip operation; and means for preventing reset of the magnetic lock by restraining movement of the solenoid when the trip circuit is disabled. In the preferred embodiment, a plunger assembly is mounted adjacent to the solenoid of the magnetic lock assembly and fusible link is connected in series with the trip circuit and mounted to prevent movement of a plunger in the plunger assembly. When the trip circuit is subjected to excessive current, the fusible link will melt, thereby permitting the plunger to interfere with movement of the armature of the solenoid. This prevents rest of the magnetic lock assembly.

4 Claims, 1 Drawing Sheet

RESIDUAL CURRENT DETECTOR WITH FAIL SAFE LOCKOUT DEVICE

BACKGROUD OF THE INVENTION

This invention relates to residual current detectors for use with electric circuit breakers, and more particularly to such residual current detectors that include an electronic trip circuit.

Circuit breakers and similar electrical contactors provide protection against faults in electrical power systems, such as overcurrent, ground fault and short circuit protection. In order to provide protection against ground fault currents or other abnormal operating conditions, circuit breakers can be equipped with an electronic residual current detector, or ground fault detector, that senses an abnormal condition and trips the circuit breaker in response to the abnormal condition. U.S. Pat. No. 5,907,461 discloses a molded case circuit breaker with ground fault protection. A ground fault circuit mounted within the circuit breaker case activates a solenoid in the event of an abnormal condition. The solenoid, in turn, trips the circuit breaker.

Residual current detectors typically include an electronic circuit that is used to detect abnormal operating conditions and a device for tripping the associated circuit breaker in response to the abnormal conditions. The electronic circuit may be powered by a transformer that is coupled to a power conductor within the circuit breaker. The tripping device may include a manually operated reset switch such that once the abnormal condition has been removed, the residual current detector can be reset. However, under some abnormal conditions, the electronic circuit portion of the residual current detector may become damaged to the point where it is inoperable.

If the electronic circuit of the residual current detector is disabled, the residual current detector will be unable to sense an abnormal condition. Therefore, it is desirable to prevent manual resetting of the residual current detector if the electronic circuit is disabled.

SUMMARY OF THE INVENTION

This invention provides a residual current detector comprising a trip circuit; a magnetic lock assembly including a solenoid that operates in response to a signal from the trip circuit, causing movement of an operating member, with the magnetic lock further including a reset mechanism for resetting the residual current detector following a trip operation; and means for preventing reset of the magnetic lock by restraining movement of the solenoid when the trip circuit is disabled.

In the preferred embodiment, a plunger assembly is mounted adjacent to the solenoid of the magnetic lock assembly and fusible link is connected in series with the trip circuit and mounted to prevent movement of a plunger in the plunger assembly. When the trip circuit is subjected to excessive current, the fusible link will melt, thereby permitting the plunger to interfere with movement of the armature of the solenoid. This prevents rest of the magnetic lock assembly.

DESCRIPTION OF THE PREFERRED EMBODIMENT

Figure 1:
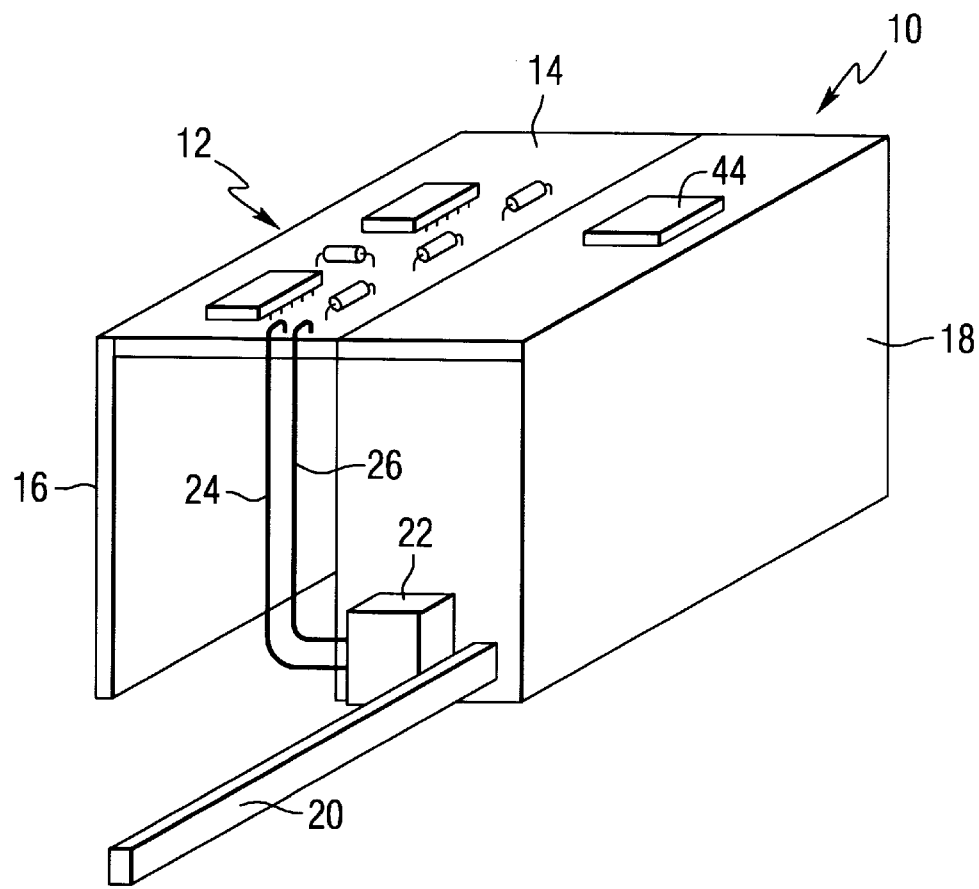
FIG. 1 is a pictorial view of a portion of a residual current detector including a lockout device constructed in accordance with the preferred embodiment of this invention.

Referring to the drawings FIG. 1 is a pictorial view of a portion of a residual current detector including a lockout device constructed in accordance with the preferred embodiment of this invention. The residual current detector 10 includes a trip circuit 12 mounted on circuit boards 14 and 16 and a magnetic lock 18 that is electrically connected to trip circuit and responds to a signal produced by the trip circuit to operate an actuator 20 that would be coupled to a trip mechanism of an associated circuit breaker, not shown, to effect operation of the circuit breaker. A reset switch is provided on the magnetic lock 18 so that following an operation of the residual current detector, the magnetic lock can be reset. All of the previously described elements of the residual current detector are found in previously known residual current detectors.

If the electronic trip circuit has become disabled, it is desirable to prevent resetting of the magnetic lock. This invention adds a plunger assembly 22 that includes a fusible element that is electrically connected in series with the trip circuit by conductors 24 and 26. In a particular residual current detector which has been modified to produce the preferred embodiment of the invention, the manual reset switch of the magnetic lock is mechanically coupled to the solenoid 42 of the magnetic lock such that solenoid armature 38 must be in a particular position to allow operation of the manual reset switch. By slightly depressing the solenoid armature 38, operation of the manual reset switch 44 is prevented.

Figure 2:
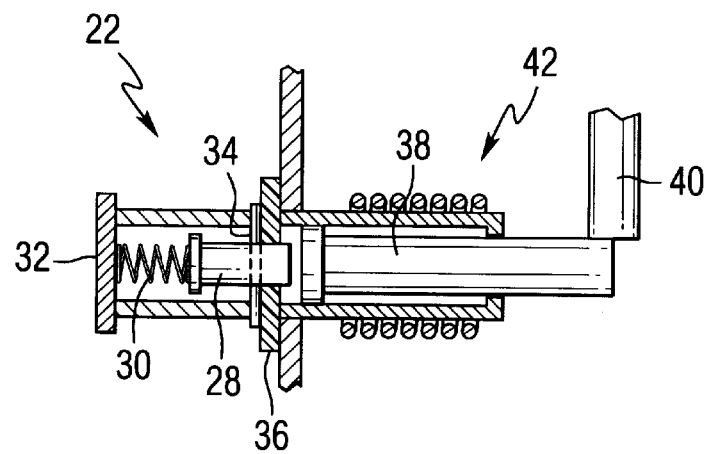
FIG. 2 is an enlarged view of the plunger assembly of the lockout device of the present invention.

FIG. 2 is an enlarged view of the plunger assembly and a portion of the residual current detector magnetic lock constructed in accordance with the present invention. In this figure, the plunger assembly 22 is shown to include a plunger 28, and a spring 30 positioned between the plunger and a support structure 32, for urging the plunger in a direction toward the magnetic lock assembly. A fusible link 34 that is electrically connected in series with the trip circuit passes through a hole in the plunger and is forced against a stop 36. Certain components of the plunger assembly can be made of insulating material so that the conductive parts of the plunger assembly are electrically isolated from the housing of the magnetic lock assembly. For example, the stop 36 and plunger may be made of insulating material and the housing of the plunger assembly may be electrically isolated from the lock housing.

When the trip circuit is subjected to an excessive current, the fusible link will melt, thereby allowing the plunger to pass farther through an opening in the stop and to come into contact with the armature 38 of the solenoid 42 of the magnetic lock assembly. The solenoid armature 38 is coupled to the reset mechanism in the magnetic lock assembly in a manner such that the reset mechanism cannot be.

Since the residual current detector lock may be mounted in a confined environment, it may be desirable to reduce the length of the added plunger assembly. In those instances, a pancake spring can be used in place of the spring illustrated in FIG. 2. the coils of a pancake spring have successively smaller diameters, such that when the spring is compressed, the coils fit within each other so that the axial length of the compressed spring is minimized.

In normal operation, the fusible link is positioned through a hole in the fail-safe plunger and holds the plunger back against the spring such that the spring is compressed (loaded). The plunger assembly is added to an existing residual current magnetic lock and is wired to the electronic trip circuit. If there is a fault condition, under normal circumstances, the trip circuit will detect the fault and cause the magnetic lock to operate, which in turn causes the operation of the associated circuit breaker. In addition to tripping the circuit breaker, residual current detectors typically also remove power from the trip circuit following the detection of an abnormal condition, thereby preventing electrical damage to the electronic trip circuit. The trip circuit would remain without power until the residual current detector is reset. However, if the operation of the magnetic lock is delayed for some reason, or if some other abnormal condition exists that would continue to supply power to the trip circuit, the trip circuit could be damaged. Under those conditions, if the magnetic lock were subsequently manually reset, the trip circuit would be inoperative. With the trip circuit disabled, the protection previously provided by the residual current detector would be lost.

With the preferred embodiment of the present invention, if the electronic trip circuit receives excessive current, the fusible link will melt and the fail safe plunger will force the armature of the solenoid in the magnetic lock assembly into a position such that the residual current detector cannot be manually reset. The fusible link not only protects the electronic trip circuit by removing power under fault conditions, but also prevents resetting of the residual current detector when the electronic trip circuit is inoperative.

This invention provides an apparatus for preventing resetting of a residual current detector lock unit when the residual current detector trip circuit has become disabled. While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A residual current detector comprising:

a trip circuit;

a solenoid that operates in response to a signal from the trip;

a plunger assembly including a plunger and a spring for forcing the plunger toward an armature of the solenoid; and a fusible link electrically connected in series with the trip circuit and mounted in the plunger assembly to prevent movement of the plunger when the fusible link is intact, wherein the fusible link melts in response to excessive current flowing in the trip circuit, thereby releasing the plunger and limiting movement of the armature.

2. The apparatus of claim 1, wherein the fusible link passes through an opening in the plunger.

3. The apparatus of claim 2, wherein the plunger assembly includes a stop through which the plunger passes, the fusible link being urged against the stop by the spring loaded plunger.

4. The apparatus of claim 1, wherein the spring comprises a pancake spring.

* * * * *